United States Patent [19]

Wiener

[11] Patent Number: 4,512,336

[45] Date of Patent: Apr. 23, 1985

[54] PANEL OF VAPOR GENERATING AND SUPERHEATING TUBES

[75] Inventor: Murray Wiener, Akron, Ohio

[73] Assignee: The Babcock & Wilcox Company, New Orleans, La.

[21] Appl. No.: 434,219

[22] Filed: Oct. 14, 1982

[51] Int. Cl.[3] .......................... F24J 3/02; F22B 37/24
[52] U.S. Cl. ................... 126/442; 126/418; 126/448; 122/6 A; 122/235 A; 122/510; 165/81; 165/172; 165/175
[58] Field of Search ............... 126/438, 442, 448, 418; 122/6 A, 235 A, 235 K, 510, 511, 512; 165/67, 81, 82, 172, 173, 175, 178, DIG. 6, 171; 60/641.8, 641.15

[56] References Cited

U.S. PATENT DOCUMENTS

| | | | |
|---|---|---|---|
| 1,691,934 | 11/1928 | Packard | 122/6 A |
| 1,702,058 | 2/1929 | Murray | 122/6 A |
| 1,825,666 | 10/1931 | Jacobus | 122/6 A |
| 1,972,100 | 9/1934 | Lucke | 122/6 A |
| 3,665,893 | 5/1972 | Barberton et al. | 122/6 A |
| 4,059,075 | 11/1977 | Ssinegurski et al. | 122/6 A |
| 4,240,234 | 12/1980 | Eisinger et al. | 122/6 A |
| 4,289,114 | 9/1981 | Zadiraka | 126/421 |
| 4,304,216 | 12/1981 | Ratelband | 165/171 |
| 4,400,946 | 8/1983 | Oplatka | 60/641.8 |

FOREIGN PATENT DOCUMENTS

1409943 10/1975 United Kingdom ................ 122/512

Primary Examiner—Margaret A. Focarino
Attorney, Agent, or Firm—Robert J. Edwards; James C. Simmons

[57] ABSTRACT

A tube panel having both vapor generating and superheating tubes. At least two parallel vapor generating tubes are spaced apart to provide a gap therebetween. A superheating tube is contiguous with each of the two vapor generating tubes and is disposed rearwardly of the gap to span the gap for receiving radiation energy from forward of the gap to assure a proper distribution of incident heat flux among the vapor generating and superheating tubes while eliminating the need for complex and expensive vibration support members for the vapor generating tubes. In accordance with a preferred embodiment, a support member is disposed rearwardly of and adjacent the superheating tube and extends transversely to the longitudinal direction thereof, and the vapor generating tubes are supported by tie bars connected between the respective vapor generating tubes and the respective support member to effectively support the superheating tube between the vapor generating tubes and the support member.

17 Claims, 7 Drawing Figures

PANEL OF VAPOR GENERATING AND SUPERHEATING TUBES

FIELD AND BACKGROUND OF THE INVENTION

The present invention relates in general to vapor generating equipment, and more particularly to a panel of vapor generating and superheating tubes in or for use in such equipment.

Significant effort has been directed in recent years toward the development of a solar receiver suitable for power generation. One of the more promising concepts is that of a solar power tower with a central receiver located on a tower. Sunshine falling on an array of computer guided tracking mirrors known as heliostats is reflected toward the receiver and the incident energy is absorbed by a heat transport fluid flowing in the receiver. Thermal energy in the fluid may be used to run a turbine generator or to provide heat for industrial use.

It is important that the solar receiver deliver the working fluid, usually steam, at a constant temperature and pressure in order for it to be acceptable for turbine operation. Water/steam receivers usually consist of three basic parts connected in series: a preheater comprised of a group of economizer tubes; an evaporator comprised of a group of steam generating tubes; and a superheater. Steam generators are discussed in *Steam, Its Generation And Use,* 39th Ed., The Babcock & Wilcox Company, 1978.

In order to maintain a constant temperature of the steam leaving the superheater, the amount of heat delivered to the superheater and to the evaporator should be properly proportioned. This proportion should remain nearly constant for all operating conditions.

Although steam generation techniques are generally well known, solar receivers operate in an environment which is different from that of fossil or nuclear steam generators. A solar receiver is exposed to daily cycling from 0 to peak power with a multitude of fast variations of heat distribution due to cloud transients. In known solar receiver designs, the panels of tubes are arranged at fixed locations on the receiver, the locations being based on clear day insolation conditions. When, during a cloud transient, the heliostat field is partially shaded, the heat distribution to the tube panels becomes unbalanced resulting in loss of control of the steam temperatures from the superheater tube panels. Because of the decreased power input to the receiver from insolation, steam generation is reduced, but the heat flux from insolation onto some receiver areas may remain high. If high heat flux on some superheater tubes coincides with high steam temperature due to reduced steam flow therein, the superheater tube metals may become overheated and overstressed resulting eventually in tube failure.

The prior art has sought to alleviate the problems discussed above, at the expense of high pressure losses and less efficient steam generation, by such means as requiring extremely high fluid flows through all of the tubes to compensate for random high heat flux in some of them, increasing the size of the solar receiver, or defocusing most of the bright heliostats from the receiver resulting in little power generation during the transient conditions.

As shown in my U.S. Pat. No. 4,245,618, it is known to provide a panel of evaporator screen tubes in front of and spaced from a panel of superheater tubes wherein the superheater tubes are provided with webs, or strips of metal sometimes known as membranes, between and along the lengths of the tubes for additional heat absorption. The membranes are also required to prevent entry of the insolation to the rear of the tubes where damage may result to the receiver as well as loss of energy. However, the use of membranes results in less efficient duplication of heating surface, the cost of membraning the superheater tubes is quite high, and additional stresses may occur in the membranes if there are temperature differentials between adjacent superheater tubes. In addition, a conventional buckstay arrangement cannot be provided to maintain appropriate innertube spacing and inhibit vibration of the screen tubes since such an arrangement would be undesirably exposed to high insolation. Instead, support bars may be welded on the back of individual screen tubes respectively which bars extend through slots in webs of the corresponding superheating tube panels for attachment to complex and expensive individual vibration support structures in back of the superheating tube panels which structures are in turn attached to the respective webs.

The indicent heat rays on the absorber surface of a central solar receiver with the heliostat field arranged northwardly of the tower are predominately parallel and only a small fraction thereof deviate from the predominate direction. When screen tubes are located in front of a superheater panel, they shade the superheater panel surface behind the screen tubes so that a superheater tube located in a shaded area will absorb a lesser amount of heat while a superheater tube located in an unshaded area of the panel will absorb a greater amount of heat. Since the steam flow per tube is about the same for adjacent superheater tubes, the temperature of the steam leaving the tubes absorbing more heat is much higher than the temperature of the steam leaving the shaded superheater tubes. This would require a higher alloy material, which is more expensive, to be provided for the superheater than would be required if the heat distribution to all tubes in a panel were uniform. In addition, temperature difference between adjacent tubes of the superheater panel may be great enough to cause excessive metal stresses which may lead to tube failures.

An object of the present invention is to avoid the difficulties mentioned above while eliminating the economically unattractive alternatives of the prior art in order to provide a significant advantage for reliable receiver operation.

It is another object of the present invention to arrange the components of a tube panel for a solar receiver so as to assure a proper distribution of incident heat flux among the vapor generating and superheating tubes while eliminating complex and expensive structure such as membranes for the superheating tubes and/or the aforementioned complex and expensive vibration support structure.

It is still another object of the present invention to provide proper heat distribution during severe cloud transients to maintain exit vapor temperatures from the superheating tubes of a solar receiver within allowable limits.

It is yet another object of the present invention to arrange the components of a solar receiver so as to assure good heat transfer while preventing overheating of the tubes during the various conditions to which a receiver is normally subjected.

It is another object of the present invention to arrange the tubes of a receiver panel so as to assure good heat transfer while preventing overheating of the tubes during the various conditions to which a receiver is normally subjected.

It is another object of the present invention to provide an inexpensive yet effective tube panel for use on the furnace walls of fossil-fired vapor generators.

It is another object of the invention to provide a simple panel construction which permits large relative longitudinal differential movement of superheater tubes relative to vapor generating tubes without excessive vibration and bowing of tubes due to temperature differentials, wind, or gas flow loading.

It is another object of the present invention to minimize the loss of infrared radiation and convection losses from a vapor generating and superheating tube panel for greater thermal efficiency of a solar receiver in which the panel is installed.

It is yet another object of the present invention to provide a tube panel for a solar receiver as well as for other types of vapor generators heated predominately by radiation which is simple in design, rugged in construction, economical to manufacture, and economical to operate.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DESCRIPTION OF THE PREFERRED EMBODIMENT

Figure 1:
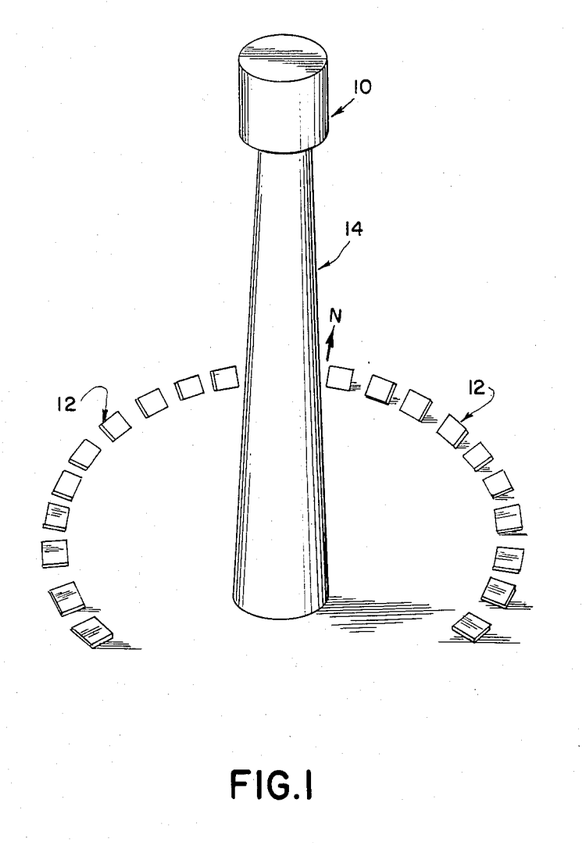
FIG. 1 is a schematic view of a solar receiver which may embody the invention and disposed on top of a tower which receives radiation from a heliostat field.

Referring to the drawings, there is shown in FIG. 1 a solar receiver 10 made up of a plurality of steam generating and superheating tubes which are distributed, in this case, in a generally cylindrical pattern and around at least a portion of the pattern for receiving solar radiation energy from a plurality of reflecting members of the heliostat field generally illustrated at 12. The receiver 10 is located on top of a tower 14 so as to be above the heliostat field. It should be noted that the tower 14 is not located at the center of the heliostat field. In the Northern hemisphere, the most efficient use of the heliostat field 12 is obtained by locating tower 14 southwardly of the field 12, as illustrated in FIG. 1. This provides a circumferential non-uniform solar heat flux to the tubes. The highest heat flux is provided to the tubes located on the north side of the receiver 10. The solar heat energy absorbed by each tube will vary according to the diurnal and seasonal variations of insolation and will also depend on cloud shadowing. It should be recognized that the location of tower 14 for a like installation in the Southern hemisphere will be northwardly of the heliostat field 12 with the highest heat flux being provided to the tubes located on the south side of the receiver 10.

Figure 2:
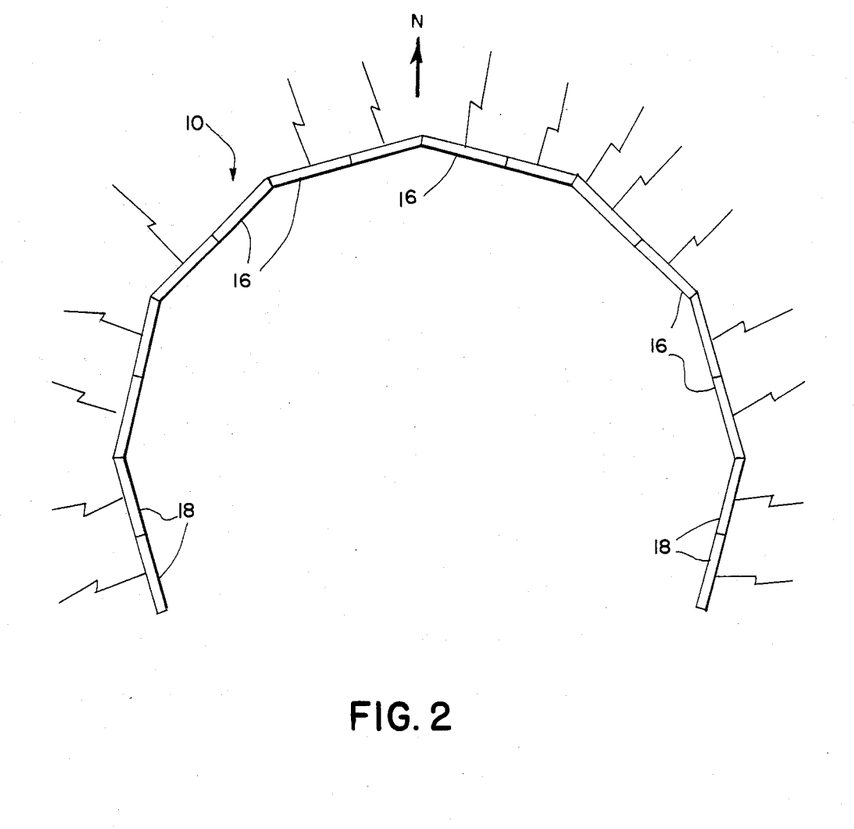
FIG. 2 is a schematic horizontal sectional view of a panel arrangement for the receiver of FIG. 1.

FIG. 2 shows schematically, in a plan sectional view, an arrangement of panels 16 and 18 of tubes for such a solar receiver 10. Tube panels 16 and 18 are, in this case, arranged on 8 sides generally facing north for the Northern hemisphere, as illustrated in FIG. 2, or south for the Southern hemisphere, of a 12 sided regular vertical prism. A typical graph of the amount of power (insolation) delivered to the receiver panels at various points along the circumference of this generally cylindrical portion has a shape resembling a sine curve, with little power at the outbound edges and a peak near the receiver center at the north axis (for the Northern hemisphere). Preheater or economizer tube panels 18 may be located on the two outboard sides as illustrated in FIG. 2 where the absorption per tube is small and varies substantially. Although the tube panels 16 and 18 are illustrated as being arranged in a generally cylindrical pattern, it should be understood that they may be arranged in any suitable pattern such as, for example, concave, convex, omega-shaped, or straight.

If uneven heat flux distribution to the receiver 10 were to result in disproportionate heat flux distributions to the superheating tubes and the vapor generating tubes, then tube overheating and failure or undesirable variations in superheater steam outlet temperatures may occur for the reasons previously described. In order to provide a nearly constant absorbed power ratio between the superheating and vapor generating parts of the receiver at any incident heat flux pattern caused by random, partial cloud cover or other transient conditions, in accordance with the present invention, at least one but preferably all of the tube panels 16 on the other six sides of the prism illustrated in FIG. 2 is comprised of both vapor generating and superheating tubes as will be described in greater detail hereinafter.

Figure 7:
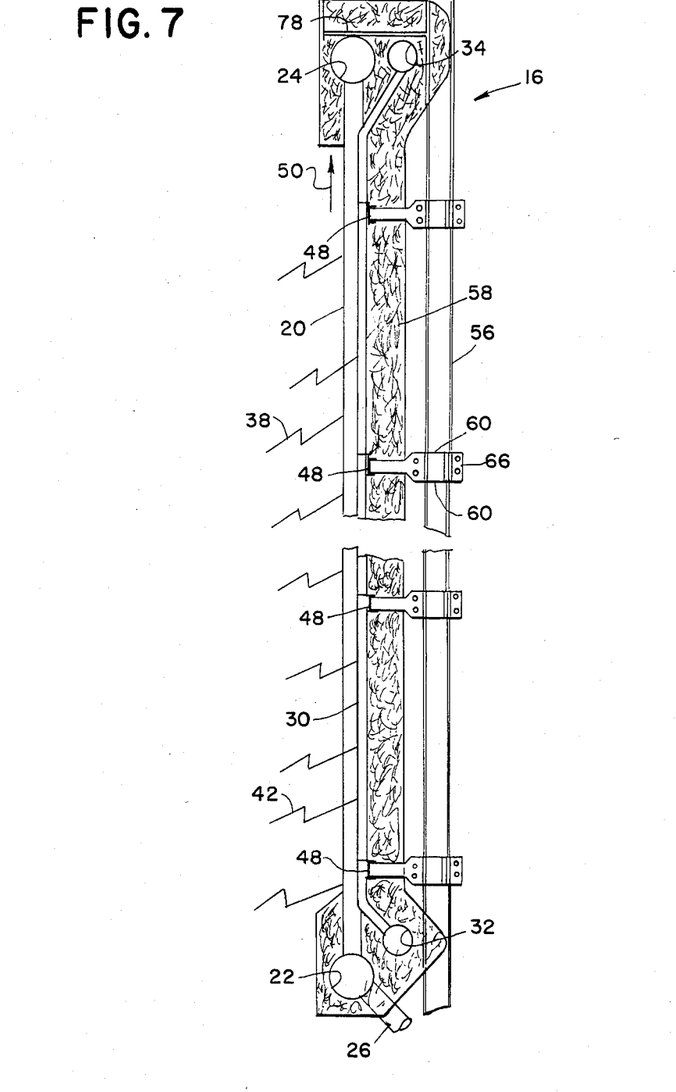
FIG. 7 is a side elevational view of a tube panel according to the invention.

There is shown in FIG. 7 a panel portion 16 of tubes embodying the present invention. For the purposes of this specification and the claims, a panel of tubes is a group of two or more tubes assembled as a unit. Referring to both FIGS. 3 and 7, there is shown a plurality of vapor generating tubes 20. These tubes 20 are preferably vertically disposed as shown and are each connected to a common inlet header 22 at the bottoms thereof and a common oulet header 24 at the tops thereof so that a common flow to the vapor generating tubes 20 and a common flow from the vapor generating tubes 20 is provided. An inlet line to inlet header 22 is shown at 26. There is also shown a plurality of superheating tubes 30 which are each connected to a common inlet header 32 at the bottoms thereof and a common outlet header 34 at the tops thereof to provide a common flow to the superheating tubes and a common flow from the superheating tubes respectively. However, it is not essential to the present invention that headers be provided for common flows to and from the tubes.

Figure 3:
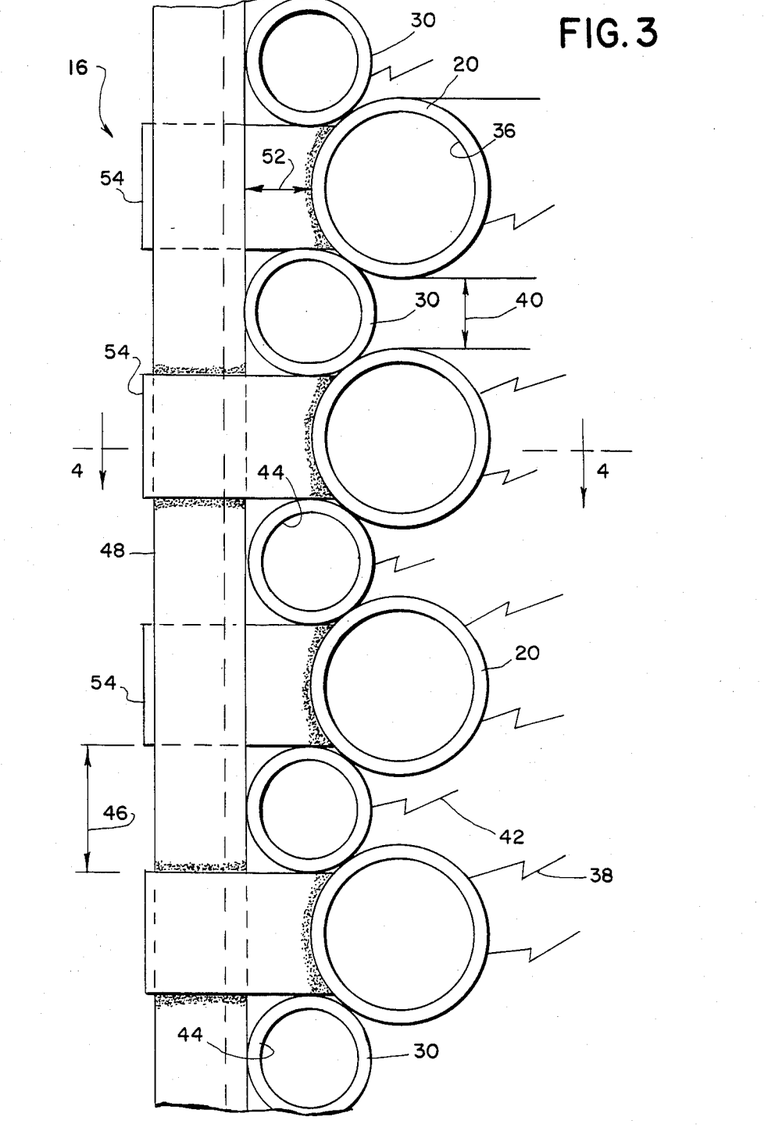
FIG. 3 is a horizontal sectional view of a portion of a tube panel according to the invention.

The tube panel portion 16 shown in FIG. 3 shows four vapor generating tubes 20 in side-by-side relationship and extending parallel to each other for receiving radiation energy such as solar radiation energy from forwardly thereof for the purpose of heating fluid such as water flowing therein through the tube spaces illustrated at 36 in order to form a vapor. For purposes of this specification and the claims, a forward part of a tube panel is that part which faces a source of radiation energy such as a boiler furnace or heliostats when the tube panel is installed for operation. Thus, for the purposes of this invention, the vapor generating tubes 20 are located forwardly of the tube panel as illustrated by the schematic representations of radiation energy at 38 contacting the vapor generating tubes.

The tube panel portion shown in FIG. 3 also shows five superheating tubes 30 alternately spaced generally between and generally rearwardly of the vapor generating tubes 20 as will be more fully explained hereinafter. These tubes 30 are also disposed in a side-by-side relationship with each other and extend parallel to each other and to the vapor generating tubes 20. Since the vapor generating tubes 20 usually require more heat than the superheating tubes 30, they are preferably larger in size than the superheating tubes and are located closer to the source such as heliostats 12 of incoming heat rays 38, as shown in FIG. 3.

With a row of vapor generating tubes 20 forward of a row of superheating tubes 30 as shown in FIG. 3, it is desirable that inexpensive yet effective means be provided for supporting the vapor generating tubes 20 so as to prevent excessive tube bowing or vibration due to wind loading and/or due to temperature differentials, and it is desirable that such supporting means be located outside of the path of insolation or radiation energy. It is also desirable to eliminate the use of expensive high alloy membranes between adjacent high alloy superheating tubes 30. In order to achieve these objects, in accordance with the present invention, the vapor generating tubes 20 are spaced apart to define a gap having a width illustrated at 40 between each two adjacent vapor generating tubes 20. A superheating tube 30 is contiguous with each of the two respective vapor generating tubes 20 and is disposed rearwardly of the gap 40 to span the gap width 40 for receiving radiation energy, schematically illustrated at 42, from forwardly of the gap 40 for the purpose of superheating generated vapor flowing through the spaces illustrated at 44 therein, and to prevent penetration of the radiation 42 rearwardly of the tubes 20 and 30. By the superheating tubes being contiguous with the vapor generating tubes is meant that they are in touching engagement with the vapor generating tubes, but sufficient clearance is provided to allow the superheating tubes to expand and contract relative to the vapor generating tubes and to allow some longitudinal movement.

Although a single superheating tube contiguous with each of two vapor generating tubes is preferred to eliminate the need for membranes between superheating tubes, in accordance with an aspect of this invention, other superheating tubular means are envisioned such as a pair of superheating tubes rigidly joined or joined by a membrane or a single superheating tube provided with membranes on each side wherein the membranes are contiguous with the vapor generating tubes.

With the vapor generating tubes 20 in fixed position as will be hereinafter more fully described, in order that the superheating tubes 30 may be supported against movements in a forwardly direction; that is, in a direction toward the source of radiation energy, and in order that each superheating tube 30 may span the respective gap width 40 in accordance with the present invention, each superheating tube 30 is provided with an outer diameter illustrated at 46 which is greater than the gap width 40. The width 40 of the gap is preferably selected to allow a predetermined fraction of incident radiation to penetrate the gap and be received by the respective superheating tube 30. This predetermined fraction of incident radiation is directly related to the fraction of heat energy which it is desired should be absorbed by the respective superheating tube, and this gap width 40 can be determined using engineering principles of common knowledge to those of ordinary skill in the art to which this invention pertains.

In order to support each of the superheating tubes 30 laterally, as shown in FIG. 3, support means such as one or more support members 48, spaced along the length of the superheating tubes, is disposed rearwardly of and extends preferably in a direction transversely to the longitudinal direction of the vapor generating and superheating tubes 20 and 30 respectively. The longitudinal direction of the tubes 20 and 30 is illustrated at 50 in FIG. 7. The support member 48 is preferably contiguous with each superheating tube 30 to thereby support each superheating tube between the respective pair of vapor generating tubes 20 and the support member 48 against movement of the respective superheating tube 30 laterally; that is, in directions transverse to the longitudinal direction 50. The support member 48 is spaced from the respective vapor generating tubes 20 a distance illustrated at 52 which is less than the outer diameter 46 of the respective superheating tube 30.

In order to laterally support the vapor generating tubes 20 along their length in accordance with a preferred embodiment of the present invention, each vapor generating tube 20 is preferably provided with a tie bar means 54 which extends from the respective vapor generating tube 20 to the support member 48 and is preferably welded to both the respective vapor generating tube 20 and support member 48. The tie bar 54 is preferably wide enough so that it is contiguous with the respective superheating tube 30 on each side thereof to further fix the position of the superheating tubes laterally against bowing and the like.

In accordance with a preferred embodiment of this invention, the tie bars 54 from alternate vapor generating tubes 20 are alternately attached to upper and lower flanges 55 and 57 respectively of the support member in order to equalize loading of the support member.

Figure 5:
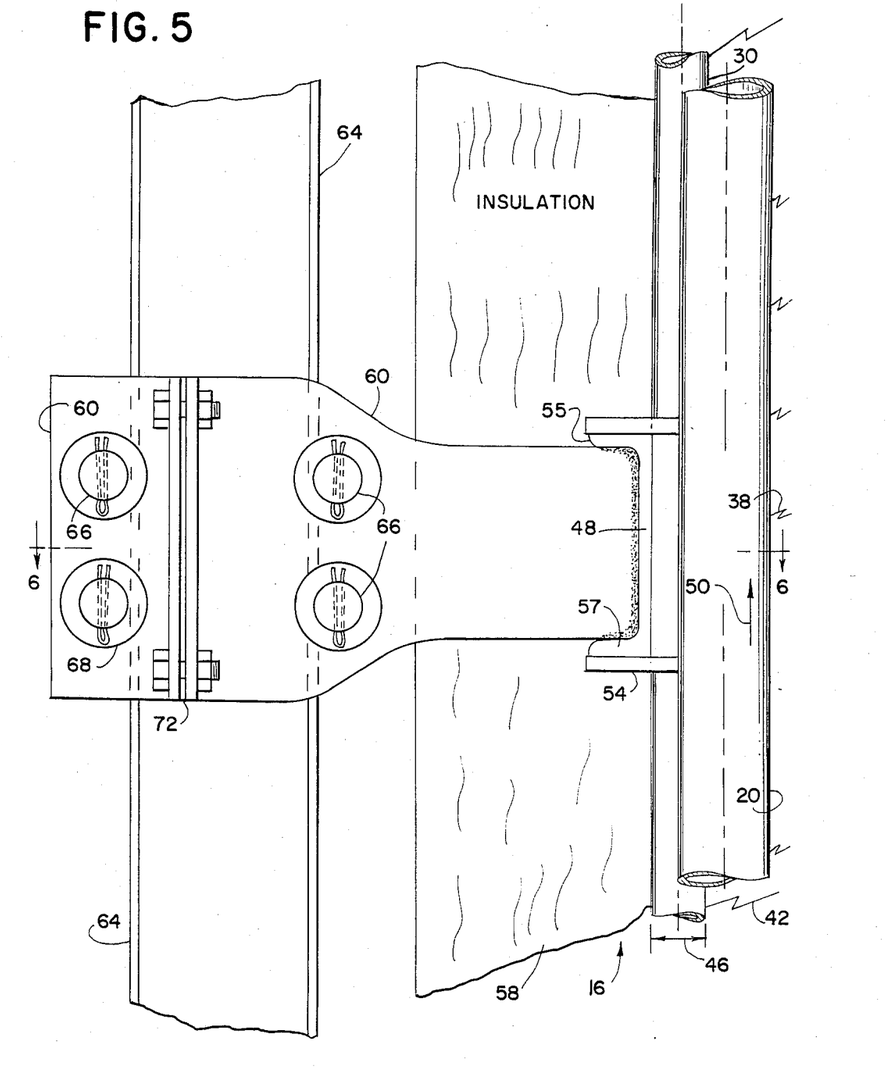
FIG. 5 is a side elevational view of a buckstay assembly showing a tube panel according to the invention connected thereto.
Figure 6:
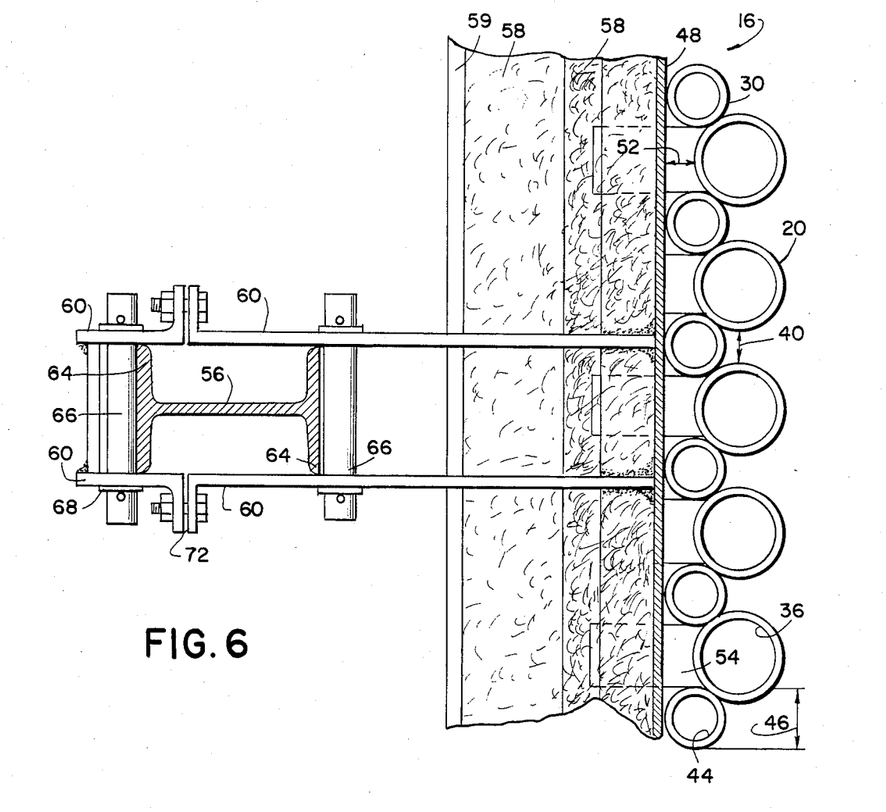
FIG. 6 is a view taken along lines 6—6 of FIG. 5.

Referring to FIGS. 5 and 6, in order to maintain panel shape under all operating conditions, the support members 48 are attached to a buckstay means 56 preferably comprising two I-beams cross-braced to provide stability. As shown in FIG. 7, two layers of insulation, illustrated at 58, and metal lagging 59 are preferably applied rearwardly of the tubes 20 and 30 and around the headers 22, 24, 32, and 34. Although the support members 48 are placed in the insulation and are in contact with hot tubes during receiver operation, the buckstays 56 are located outside and rearwardly of the insulation to be fully protected from radiation energy directed at the panels 16 and therefore remain relatively cold. Although any suitable means may be provided, a preferred arrangement for connecting the buckstays 56 to the support members 48 is shown in FIGS. 5 and 6. Each such connecting means comprises two brackets 60 spaced to encompass the flanges 64 of the buckstay 56. A pair of rollers 66 is mounted in each bracket 60 to roll along the respective flange 64 of buckstay 56 to facilitate unrestrained differential expansion of the tube panels in a direction longitudinally (in this case, vertically) of the tubes. At 68 are shown washers used for mounting the rollers. Shim plates 72 are preferably provided at the bolted junction of the brackets 60 to provide adjustment of the rollers 66.

Figure 4:
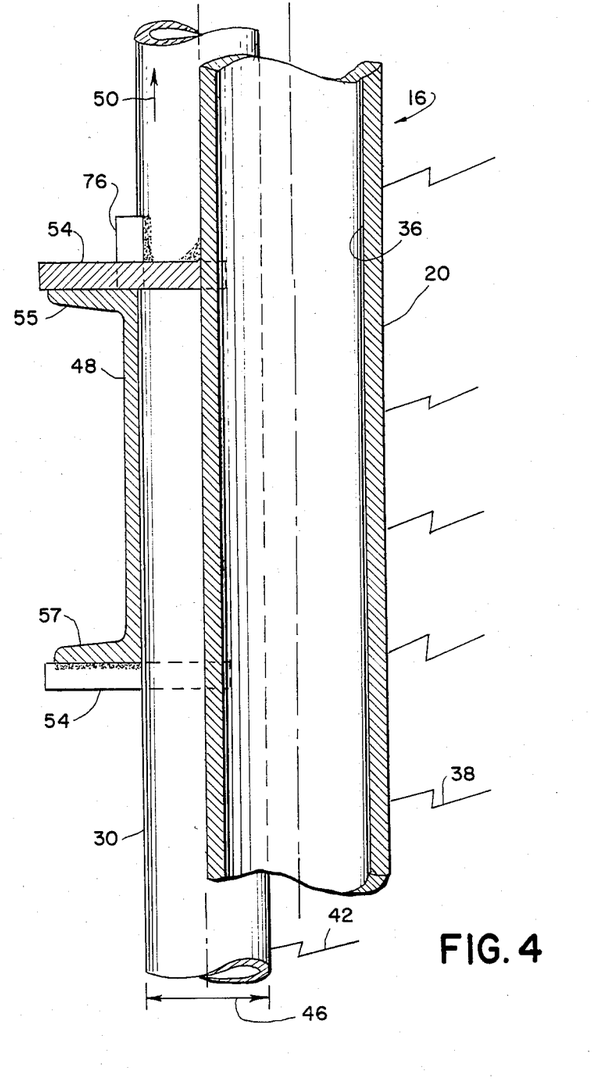
FIG. 4 is a view taken along line 4—4 of FIG. 3.

In accordance with a preferred embodiment of the invention, the tubes 20 and 30 extend vertically for flow in an upwardly direction from the inlet headers 22 and 32 to the outlet headers 24 and 34 respectively. However, it should be realized that other embodiments for orientation of the tubes may be provided such as horizontally extending tubes or tubes wherein the flow is in a downwardly direction. Side-to-side expansion differentials are accomodated by providing clearance between the sides of brackets 60 and buckstay flanges 64. The superheating tubes 30 are preferably supported from an upper support member 48 by means of a shear lug 76 welded to each tube 30 respectively and resting on the respective support member 48, as shown in FIG. 4. The vapor generating and superheating tubes 20 and 30 respectively may be composed of a suitable alloy steel which can be selected based on temperature considerations and with the utilization of engineering principles of common knowledge to those of ordinary skill in the art to which this invention pertains.

The panel 16 including insulation 58 and buckstays 56 may be shop assembled and shipped as a unit. However, if desired, insulation and lagging may be field applied. Lifting lugs (not shown) may be provided on the buckstays 56 to facilitate lifting the panel 16 for attaching to the main receiver structure. Cross beams 78 may be rigidly attached to the buckstays 56 for supporting vertically the tubes of the panel 16 by means of outlet header attachments (not shown) such as U-bolts to the cross beam 78.

The incident heat rays on the absorber surface of a cental solar receiver are predominantly nearly parallel and only a small fraction of them deviate from the major direction so that it is believed that only an insignificant amount of heat radiation can penetrate between the superheating and vapor generating tubes of a panel embodying the present invention and into the insulation 58 which is applied rearwardly of the tubes.

Since the superheating tubes 30 are recessed behind the gap 40, it is believed that only a small proportion of infrared radiation emitted by the hot superheating tubes will escape to the atmosphere and a major proportion of that radiation will be absorbed by the adjacent cooler vapor generating tubes 20. Thus, since it is expected that the panels embodying the present invention will experience a lesser infrared radiation heat loss than other known panel constructions, and since the superheater tubes 30, being recessed behind the gap 40, should also have reduced convection losses, it is expected that improved thermal efficiency of a solar receiver embodying this invention will result.

While the panel 16 embodying the present invention has been shown and described for use in a solar central receiver, it should be understood that such a panel 16 may be advantageously used also in other applications where heat is absorbed by two streams of working fluid predominantly by radiation. For example, it is envisioned that panels embodying the present invention may be used to provide so called "curtain walls" in conventional fossil-fired furnaces to accommodate superheater or reheater surfaces on the furnace walls.

The various tube sizes, numbers of tubes, types of materials, and the like can be selected using engineering principles of common knowledge to those of ordinary skill in the art to which this invention pertains. The use and operation of a solar receiver or fossil-fired boiler having panels embodying the present invention for generating superheated vapor is within the purview of engineering principles commonly known to one of ordinary skill in the art to which this invention pertains. Attemperators as well as vapor flow regulation individually to the panels to control superheater outlet temperatures from the respective panels may also be provided in accordance with engineering principles of common knowledge to those of ordinary skill in the art to which this invention pertains.

Certain features of this invention may sometimes be used to advantage without a corresponding use of the other features. While a specific embodiment of the invention has been shown and described in detail to illustrate the application of the principles of the invention, it will be understood that the invention may be embodied otherwise without departing from such principles. For example, suitable fluids other than water and steam may be utilized in the tube panels 16 for providing thermal energy, and the panels may be distributed in various suitable patterns other than cylindrical.

What is claimed is:

1. A tube panel comprising at least two parallel vapor generating tubes for receiving radiation energy from forwardly thereof to heat fluid flowing therein to form vapor, each of said vapor generating tubes has a cylindrical outer surface, said cylindrical outer surfaces of said vapor generating tubes are spaced-apart to define a gap having a width, a superheating tube disposed parallel to and contiguous with said cylindrical outer surface of each of said two vapor generating tubes to span said gap for receiving radiation energy from forward of said gap to superheat vapor flowing in said superheating tube, said gap is unobstructed such that insolation may penetrate said gap to be absorbed by said superheating tube, said superheating tube has a diameter which is less than the diameter of either of said vapor generating tubes and is disposed rearwardly of a straight line connecting the centers of said vapor generating tubes such that a major portion of radiation which is emitted by the superheating tube will be absorbed by the vapor generating tubes, and means for supporting said superheating tube in contiguous relation with said vapor generating tubes.

2. A tube panel as in claim 1 wherein said support means comprises at least one support member disposed rearwardly of and extending in a direction transversely to the longitudinal direction of said superheating and vapor generating tubes, said support member is spaced from each of said vapor generating tubes a distance which is less than said superheating tube outer diameter, and said support member is contiguous with said superheating tube to support said superheating tube between said vapor generating tubes and said support member.

3. A tube panel as in claim 2 wherein said support means further comprises a tie bar means extending from each of said vapor generating tubes to said support member to support said respective vapor generating tubes.

4. A tube panel as in claim 3 wherein said tie bar means of alternate vapor generating tubes are attached to upper and lower flanges alternately of said support member.

5. A tube panel as in claim 3 wherein said tie bar means is contiguous with said superheating tube.

6. A tube panel as in claim 1 wherein said superheating tube has an outer diameter greater than said gap width.

7. A tube panel as in claim 1 wherein the tube panel comprises at least two of said superheating tubes, the tube panel further comprising a vapor generating tube inlet header to which said vapor generating tubes are attached to provide a common flow to said vapor generating tubes, a vapor generating tube outlet header to which said vapor generating tubes are attached to provide a common flow from said vapor generating tubes, a superheating tube inlet header to which said superheating tubes are attached to provide a common flow to said superheating tubes, and a superheating tube outlet header to which said superheating tubes are attached to provide a common flow from said superheating tubes.

8. A tube panel as in claim 1 wherein said superheating tube is disposed to extend vertically, said support means comprises a support member disposed rearward of and contiguous with said superheating tube, and the tube panel further comprises means for supporting said superheating tube in the vertical direction, said vertical supporting means including a member fixedly attached to said superheating tube for resting on said support member, and the tube panel further comprises a buckstay means to which said support means is attached to maintain panel shape.

9. A tube panel as in claim 1 wherein said superheating tube is supported relative to said vapor generating tubes to allow for longitudinal expansions and contractions of said superheating tube relative to said vapor generating tubes.

10. A solar receiver comprising at least one tube panel, said tube panel comprises at least two parallel vapor generating tubes for receiving solar radiation energy from forwardly thereof to heat fluid flowing therein to form vapor, each of said vapor generating tubes has a cylindrical outer surface, said cylindrical outer surfaces of said vapor generating tubes are spaced-apart to define a gap having a width, a superheating tube having a diameter which is less than the diameter of either of said vapor generating tubes, said superheating tube is disposed rearwardly of a straight line connecting the centers of said vapor generating tubes and parallel to and contiguous with said cylindrical outer surface of each of said two vapor generating tubes to span said gap for receiving solar radiation energy from forward of said gap to superheat generated vapor flowing in said superheating tube, said gap is unobstructed such that insolation may penetrate said gap to be absorbed by said superheating tube, and means for supporting said superheating tube in contiguous relation with said vapor generating tubes.

11. A solar receiver as in claim 10 wherein said superheating tube has an outer diameter which is greater than said gap width.

12. A solar receiver as in claim 10 wherein said support means comprises at least one support member disposed rearwardly of and extending in a direction transversely to the longitudinal direction of said superheating and vapor generating tubes, said support member is spaced from each of said vapor generating tubes a distance which is less than the outer diameter of said superheating tube, and said support member is contiguous with said superheating tube to support said superheating tube between said vapor generating tubes and said support member.

13. A solar receiver as in claim 12 wherein said support means further comprises a tie bar means extending from each of said vapor generating tubes to said support member to support said respective vapor generating tubes.

14. A solar receiver as in claim 10 comprising a plurality of said tube panel in side-by-side relationship and distributed over the pattern of receiver tube panels to maintain delivery of solar radiation energy to the vapor generating tubes and to the superheating tubes proportionately during different solar radiation conditions.

15. A solar receiver as in claim 14 wherein said superheating tube has an outer diameter which is greater than said gap width.

16. A solar receiver as in claim 14 wherein said support means comprises at least one support member disposed rearwardly of and extending in a direction transversely to the longitudinal direction of said superheating and vapor generating tubes, said support member is spaced from each of said vapor generating tubes a distance which is less than the outer diameter of said superheating tube, and said support member is contiguous with said superheating tube to support said superheating tube between said vapor generating tubes and said support member.

17. A solar receiver as in claim 16 wherein said support means further comprises a tie bar means extending from each of said vapor generating tubes to said support member to support said respective vapor generating tubes.

* * * * *